United States Patent [19]

Mori

[11] Patent Number: 5,530,499
[45] Date of Patent: Jun. 25, 1996

[54] WATERPROOF CAMERA

[75] Inventor: Ryuichi Mori, Yokohama, Japan

[73] Assignee: Nikon Corporation, Tokyo, Japan

[21] Appl. No.: 219,252

[22] Filed: Mar. 29, 1994

[30] Foreign Application Priority Data

May 24, 1993 [JP] Japan ................. 5-032315 U

[51] Int. Cl.⁶ .................................................. G03B 17/08
[52] U.S. Cl. .................................................. 354/64
[58] Field of Search ................ 354/64, 288; 352/242; 348/81

[56] References Cited

U.S. PATENT DOCUMENTS

| | | | |
|---|---|---|---|
| 2,944,474 | 7/1960 | Dennis | 354/64 |
| 3,831,182 | 8/1974 | Shimizu | 354/64 |
| 4,295,721 | 10/1981 | Rebikoff | 354/64 |
| 4,375,323 | 3/1983 | Inagaki et al. | 354/64 |
| 4,383,743 | 5/1983 | Nozawa et al. | 354/64 |
| 4,803,504 | 2/1989 | Maeno et al. | 354/64 |
| 5,177,515 | 1/1993 | Tsukamoto | 354/64 |
| 5,305,032 | 4/1994 | Arai | 354/64 |

FOREIGN PATENT DOCUMENTS 4-133243  12/1992  Japan .

Primary Examiner—A. A. Mathews
Attorney, Agent, or Firm—Oliff & Berridge

[57] ABSTRACT

In order to prevent water that passes by the seal between an outer box and a back plate of a waterproof camera when the back plate is opened from damaging a camera mechanism, a cover that covers the gap between the outer box and the camera mechanism is formed so that the radially inner portion of the cover, which forms an aperture through which the rear portion of the camera mechanism can be accessed, protrudes toward the back plate farther than the radially outer portion of the cover.

22 Claims, 4 Drawing Sheets

WATERPROOF CAMERA

BACKGROUND OF THE INVENTION

1. Field of the Invention

This invention relates to a waterproof camera having a waterproof seal provided between the outer box and a back plate of the camera, and is especially constructed to prevent the infiltration into the camera of water remaining behind the waterproof seal.

2. Description of Related Art

FIG. 6 is a cross-sectional view of a conventional type waterproof camera. FIG. 7 is an enlarged view showing the waterproof seal of the conventional waterproof camera.

As shown in FIG. 6, the camera mechanism 25 is received into the outer box 22, after which it is enclosed by the back plate 23. A cover 26 is provided to cover a gap 22b that is present between the outer box 22 and the camera mechanism 25. Cover 26 prevents gap 22b from being visible from the photographer side (the right side in FIG. 6) of the camera. A resilient material 26a seals the radially outer portion of cover 26 to the outer box 22. The radially inner portion of cover 26, which is defined by flat surface 26b of cover 26, defines an aperture through which the rear portion of camera mechanism 25 may be accessed.

As shown in FIG. 7, a waterproof seal is formed by the resilient force of an O-ring 24, which is inserted into the seal groove 23a of the back plate 23, and contacts the seal wall 22a of the outer box 22. A waterproof glass 28 also is provided and is fitted into the front surface (left side of FIG. 6) of the outer box 22. An O-ring 29 is located between the outer box 22 and the waterproof glass 28. With this type of waterproof seal construction, infiltration of water into the interior of the camera is prevented and the camera mechanism 25 and photographic lens 27 accommodated within the outer box 22 is protected from water.

With the conventional type of waterproof cameras described above, when water pressure increases, the water infiltrates and remains in the gap 31a up to the seal wall 22a of the O-ring 24 and in the gap 31b between the back plate 23 and the outer box 22, as shown in FIG. 7. Even if wiped away from the outside, water remains in the gaps 31a, 31b and cannot be evacuated easily when the back plate 23 is in the closed position. When the back plate 23 is opened, the trapped water travels along the seal wall 22a and forms water droplets on the flat surface 26b of the cover 26. Furthermore, the problem exists that water seeps into the interior past the aperture of cover 26, causing corrosion of the camera mechanism 25 and making it inoperable.

SUMMARY OF THE INVENTION

The present invention, developed to overcome this problem, has an object of preventing water that has entered the seal from infiltrating into the camera mechanism.

In order to accomplish this and other objects, the waterproof camera according to the present invention forms the cover that covers the gap between the camera mechanism and the outer box so that the inner side of its aperture protrudes toward the back plate farther than the cover's radially outer perimeter, which is attached to the outer box. The waterproof camera also includes a camera mechanism, which performs the photographing action, an outer box having a rear aperture and that is arranged so as to cover the camera mechanism, and a back plate supported by the outer box and that can expose and cover the rear aperture.

Because the cover on the waterproof camera constructed as described above is formed so that the inner side of its aperture protrudes toward the back plate, the water that remains in the gap between the back plate and the outer box up to the seal is stopped by the cover, even if this water enters the interior of the outer box when the back plate is opened. Thus, water is prevented from entering the camera mechanism.

BRIEF DESCRIPTION OF THE DRAWINGS

Preferred embodiments of the invention will be described with reference to the following drawings in which like reference numerals refer to similar elements and wherein.

DETAILED DESCRIPTION OF PREFERRED EMBODIMENTS

An explanation of preferred embodiments of this invention is provided hereafter, with reference to the drawings.

Figure 1:
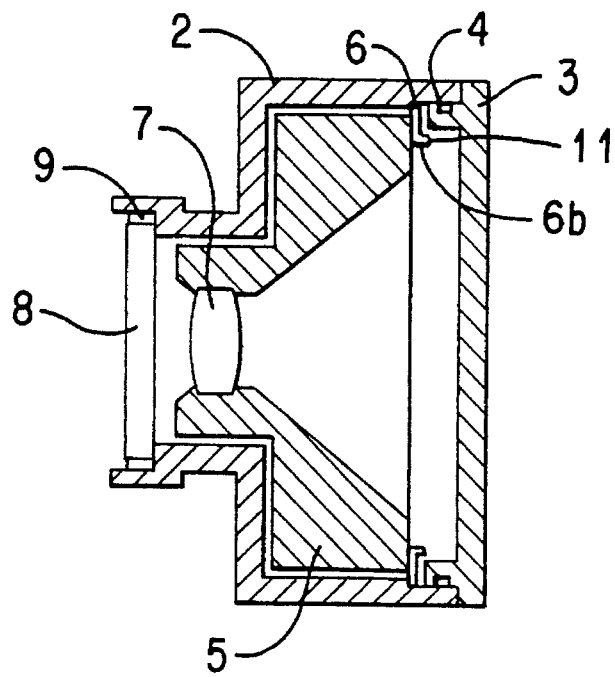
FIG. 1 is a cross-sectional view of a first embodiment of a waterproof camera according to the invention.
Figure 2:
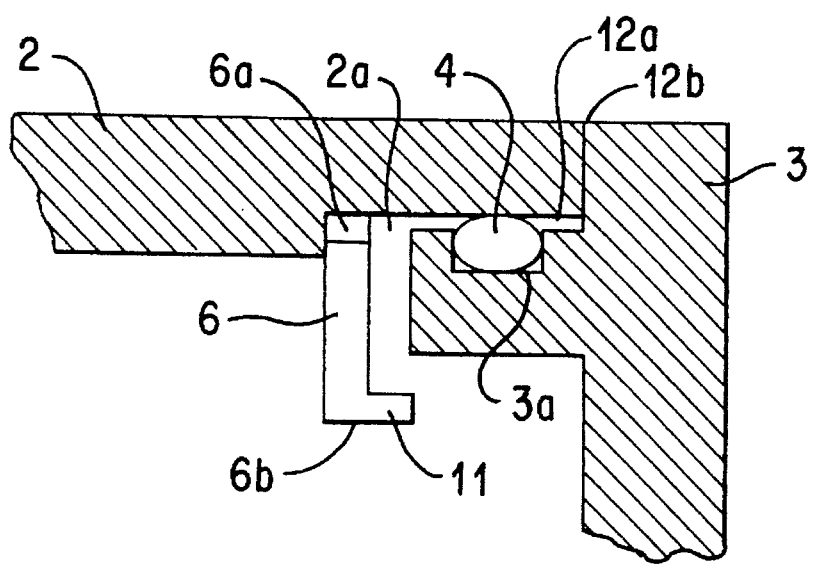
FIG. 2 is an enlarged cross-sectional view of the first embodiment of the waterproof camera.
Figure 8:
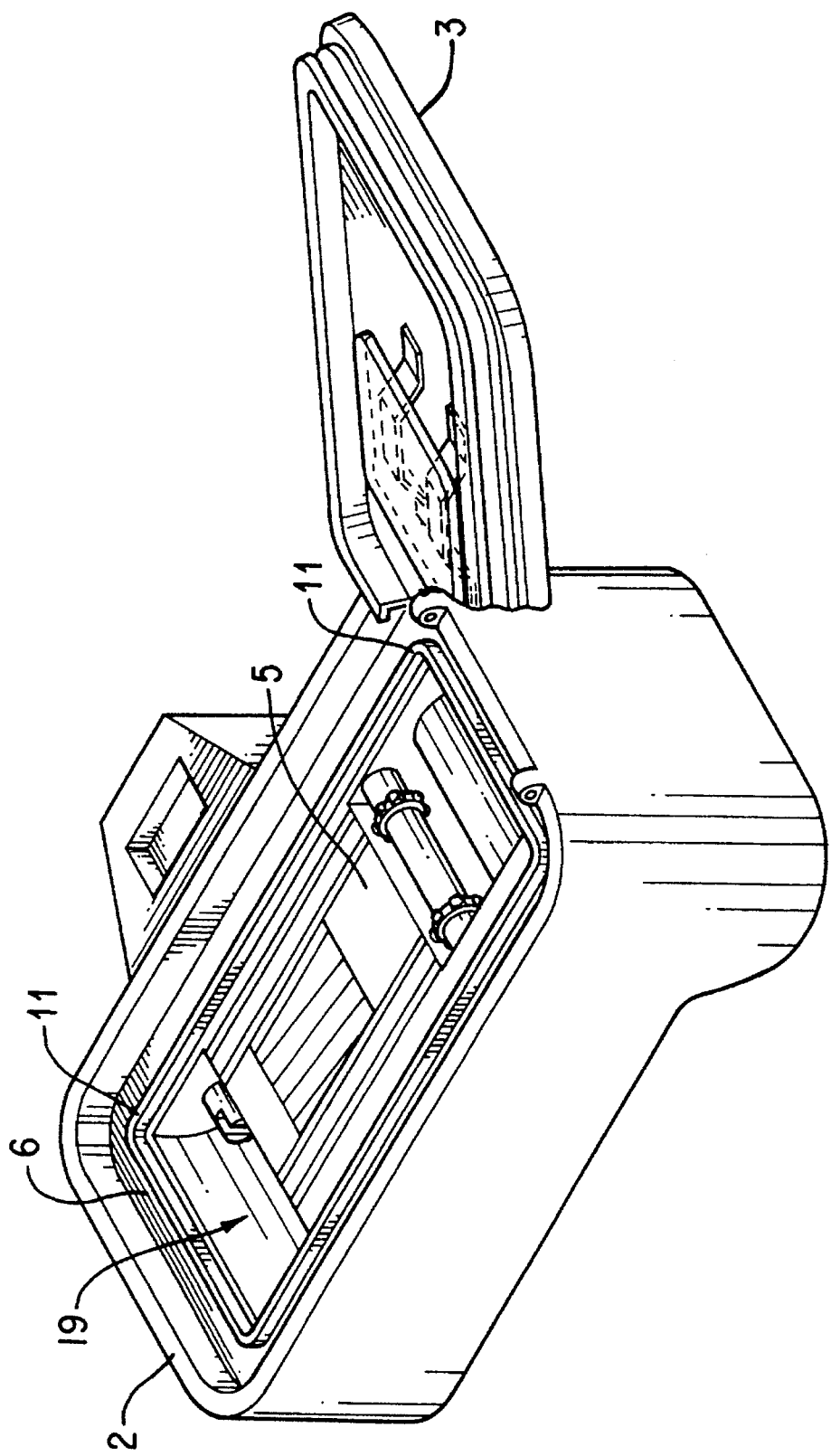
FIG. 8 is a perspective view of the FIG. 1 waterproof camera with the back plate in the open position.

FIG. 1 is a cross-sectional view of a first embodiment of the waterproof camera according to the invention. FIG. 2 is an enlarged cross-sectional view showing the waterproof seal of the first embodiment. FIG. 8 is a perspective view of the waterproof camera according to the first embodiment.

In FIG. 1, the waterproof camera includes an outer box 2 and a back plate 3, which selectively opens and closes over a rear aperture of the outer box 2. The rear portion of the camera mechanism can be accessed through the rear aperture of the outer box as is well known. A seal groove 3a is provided around the perimeter of the back plate 3, into which an O-ring 4 is inserted as the sealing component. The camera mechanism 5 and the photographic lens 7 are housed in and supported by the outer box 2.

A waterproof glass 8 is positioned in front of the photographic lens 7, with an O-ring 9 being placed between the outer box 2 and the waterproof glass 8. A cover 6 is arranged behind the camera mechanism 5 and contacts the outer box 2 and the camera mechanism 5. A resilient material 6a is arranged as a sealing component in the gap between the radially outer perimeter of the cover 6 and the seal wall 2a of outer box 2. Resilient material 6a prevents droplets of water from infiltrating into the interior of the outer box through this gap.

According to a first embodiment of the invention, a waterproof lip 11 is provided on cover 6 and protrudes, for example, about 3 to 5 mm toward the back plate 3. As shown in FIG. 8, waterproof lip 11 is formed around the entire radially inner perimeter of cover 6 and, therefore, surrounds the camera mechanism 5. The radially inner portion of cover 6, and, therefore lip 11, extends continuously around the inside of outer box 2 and defines an aperture 19 through which the back of camera mechanism 5 can be accessed.

Lip 11 prevents water droplets that remain on the cover 6 from infiltrating into the camera mechanism farther than the radially inner aperture 6b of the cover 6. (Although lip 11 is shown on the radially innermost portion of cover 6, it also could be placed a distance outward therefrom, for example, between the radially innermost and outermost portions of cover 6.)

Conventional technology can be used in the construction of the camera mechanism 5 and the back plate 3 which is installed into the outer box 2, as well as for the construction for opening and closing the back plate 3. For example, back plate 3 can be pivotally attached to outer box 2.

When the waterproof camera described above is subjected to water pressure, water will infiltrate into the seal groove 3a from the gap 12a between the outer box 2 and the back plate 3. After the water pressure has been removed from the waterproof camera, the water will remain (trapped) in the gap 12a formed by the seal groove 3a and the O-ring 4. Additionally, when the back plate 3 is opened, water will remain in the gap 12b (indicated by a solid line on FIGS. 1 and 2) occurring between the outer box 2 and the back plate 3.

When the back plate 3 is opened without removing the water remaining in gaps 12a and 12b, water travels along the seal wall 2a and forms into droplets, which remain on top of the lip 11 of the cover 6. Even when the camera is subjected to shaking and other external forces, the water droplets will move around on the top of the lip 11 of cover 6, but will be prevented from infiltrating into the camera mechanism, thereby avoiding such misfortunes as faulty operation and corrosion of the camera mechanism.

The user easily can remove the water droplets that remain on the cover 6 with an absorbent cloth so as to further reduce the possibility that they will infiltrate into the camera mechanism.

In the first embodiment of FIGS. 1, 2 and 8, cover 6 is provided as a separate element from the camera mechanism. The first embodiment cover 6 is an annular or ring type of structure having an "L-shaped" cross-section. As will be detailed below, however, other arrangements are possible and within the scope of the invention.

Figure 3:
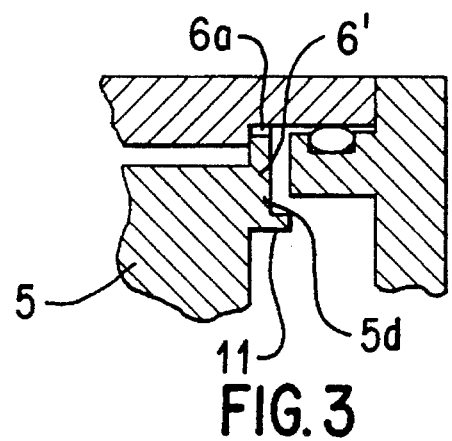
FIG. 3 is an enlarged cross-sectional view of a second embodiment of a waterproof camera according to the invention.
Figure 4:
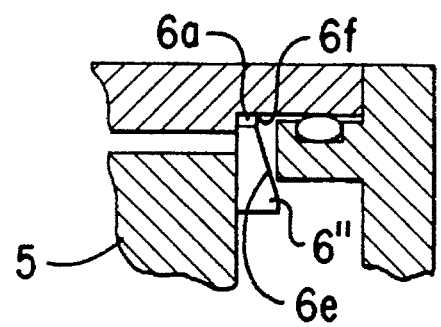
FIG. 4 is an enlarged cross-sectional view of a third embodiment of a waterproof camera according to the invention.
Figure 5:
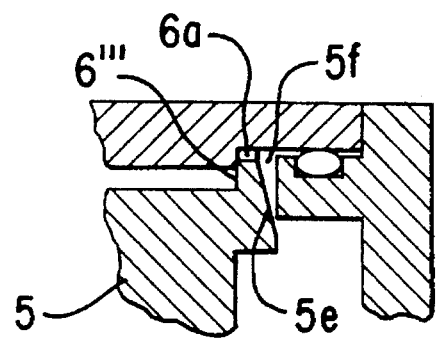
FIG. 5 is an enlarged cross-sectional view of a fourth embodiment of a waterproof camera according to the invention.

FIGS. 3, 4, and 5 are enlarged cross-sectional views of second, third and fourth embodiments, respectively, of the invention. Throughout the figures, components corresponding to those appearing in FIGS. 1, 2 and 8 are labelled with the same reference numbers in order to eliminate the need for redundant explanations.

As shown in FIG. 3, in the second embodiment, the cover 6' and camera mechanism 5 referred to in the first embodiment are formed into a single (i.e., unitary) component. A resilient material 6a is inserted into the gap between the cover 6' of camera mechanism 5 and the seal wall 2a of the outer box 2, to prevent the infiltration of water into the interior of the camera mechanism 5.

A waterproof lip 11 is provided on the flat surface 5d on the outer perimeter of the camera mechanism 5 (i.e., on the cover 6' that is unitary with camera mechanism 5). As in the first embodiment, lip 11 preferably extends entirely around the rear side of the camera mechanism and protrudes about 3 to 5 mm toward the back plate 3. Lip 11 is formed around the entire perimeter and causes water droplets to remain on the flat surface 5d of the outer perimeter, preventing its infiltration into the interior of the camera mechanism 5.

As shown in FIG. 4, the third embodiment includes a cover 6" at the rear of the camera mechanism 5. As in the first embodiment, cover 6" is separate from and contacts the outer box 2 and the camera mechanism 5. A resilient material 6a is inserted into the gap between the outer perimeter of the cover 6" and the seal wall 2a, which prevents infiltration of water into the interior of the camera mechanism 5 through this gap.

A bevelled surface 6e is formed between the radially outer perimeter of the cover 6" and the radially inner side thereof. When the outer box 2 is placed with the photographic lens 7 down (as typically is done when back plate 3 is opened, for example, to replace film), water that has travelled along the seal wall 2a forms into droplets in the corner 6f between the bevelled surface 6e and the seal wall 2a through the action of gravity. This structure prevents the water droplets from infiltrating into the camera mechanism 5 farther than the aperture formed by the cover 6".

As shown in FIG. 5, a fourth embodiment is similar to the second embodiment in that the cover 6''' and camera mechanism 5 are formed into a single (i.e., unitary) component. A resilient material 6a is inserted into the gap between the camera mechanism 5 and the seal wall 2a of the outer box 2, which prevents infiltration of water into the interior of the camera mechanism 5.

As in the third embodiment, a bevelled surface 5e is formed on the rearward facing portion of the cover 6''' that is unitary with camera mechanism 5 between the radially outer perimeter of cover 6''' and the radially inner side thereof.

When the outer box 2 is placed with the photographic lens 7 down, water that has crossed the seal wall 2a forms into droplets in the corner 5f between the bevelled surface 5e and the seal wall 2a through the action of gravity. This prevents the water droplets from rising over the bevelled surface 5e and infiltrating into the camera mechanism 5.

Although the illustrated embodiments provide structures in which the radially innermost portion of the cover protrudes toward the back plate and is closest to the back plate, while the radially outermost portion of the cover does not protrude and is farthest from the back plate, other arrangements are possible. For example, the radially innermost and outermost portions of the cover can protrude toward the back plate to be closest to the back plate, with a portion of the cover between the radially innermost and outermost portions not protruding and being farthest from the back plate. With such a structure, the cover also holds trapped water, preventing the water from reaching the camera mechanism. The main structural requirement is that some portion of the cover that is spaced from the inner surface of the outer box protrude toward the back plate and that some other portion of the cover between the protruding portion and the inner surface of the outer box does not protrude toward the back plate so as to be farther from the back plate than the protruding portion.

Figure 6:
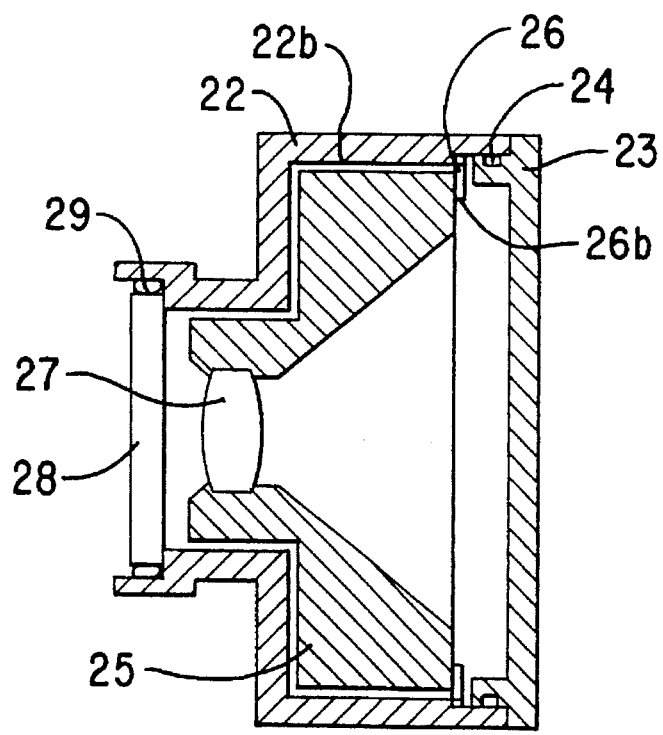
FIG. 6 is a cross-sectional view of a conventional waterproof camera.
Figure 7:
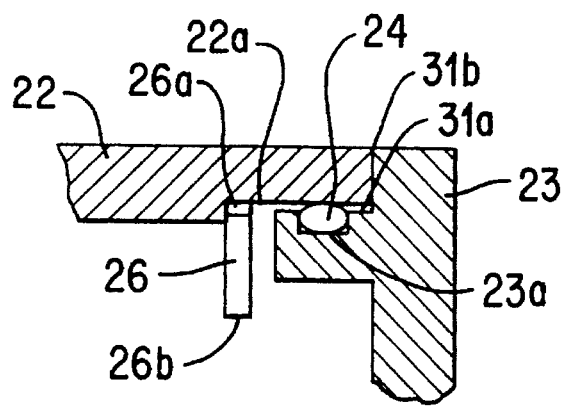
FIG. 7 is an enlarged cross-sectional view of the conventional waterproof camera of FIG. 6.

By using the waterproof camera according to the present invention, water droplets can be prevented from infiltrating into the interior of the camera, even when the back plate is opened, and even when the water that remains in the gaps after the waterproof camera has been used underwater has not been removed sufficiently. This is accomplished, for example, by constructing the cover (which can be unitary or separate from the camera mechanism) that extends between and covers the gap between the camera mechanism and the outer box such that the radially inner portion of the cover (which can form an aperture through which the rear portion of the camera mechanism is accessed) projects farther away from the camera mechanism (i.e., toward a back plate) than the radially outer portion of the cover. This structure performs the function of catching and trapping water that travels past a seal member (such as O-ring 4) along the sealing surface 2a of outer box so that this water is prevented from travelling beyond the radially inner portion of the cover and onto the camera mechanism. Instead, the water remains trapped on the rear surface of the cover. The cover and outer box define a three-dimensional chamber, or volume, in which water can be held. This differs from the conventional structure, shown in FIGS. 6 and 7, in which no volume is formed between outer box 22 and cover 26—allowing water that reaches the rear surface of cover 26 to run off its radially inner portion and into the camera mechanism.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. A waterproof camera comprising:

a camera mechanism that performs photographic processes;

an outer box having a rear aperture, said outer box covering said camera mechanism so that said camera mechanism can be accessed through said rear aperture, a gap being provided between said outer box and said camera mechanism;

a back plate attached to said outer box so that said back plate can selectively open and close said rear aperture; and a cover that covers said gap, said cover having a radially inner portion that defines an aperture through which said camera mechanism can be accessed when said back plate is open and having a radially outer portion that is arranged around the radially inner portion and facing said back plate, said radially inner portion protruding toward said back plate farther than a most protruding portion toward said back plate of the radially outer portion.

2. The camera of claim 1, wherein said cover has an L-shaped cross-section, with one leg of said L defining said radially inner portion.

3. The camera of claim 1, wherein a surface of said cover that is opposed to said back plate is inclined so that said radially inner portion of said cover protrudes toward said back plate farther than said radially outer portion of said cover.

4. The camera of claim 1, wherein said cover is a single piece with a rear portion of said camera mechanism.

5. The camera of claim 1, wherein said cover is separate from said camera mechanism.

6. The camera of claim 2, wherein said cover is a single piece with a rear portion of said camera mechanism.

7. The camera of claim 2, wherein said cover is separate from said camera mechanism.

8. The camera of claim 3, wherein said cover is a single piece with a rear portion of said camera mechanism.

9. The camera of claim 3, wherein said cover is separate from said camera mechanism.

10. The camera of claim 1, wherein said radially outer portion of said cover is attached to said outer box.

11. The camera of claim 1, wherein said radially outer portion of said cover is attached to said outer box by a resilient sealing material.

12. The camera of claim 1, further comprising a sealing member between said back plate and said outer box that forms a waterproof seal between said back plate and said outer box when said back plate closes said rear aperture of said outer box.

13. The camera of claim 1, wherein said radially inner portion extends continuously around the aperture through which said camera is accessed.

14. A waterproof camera comprising:

a camera mechanism that performs photographic processes;

an outer box having a rear aperture, said outer box covering said camera mechanism so that said camera mechanism can be accessed through said rear aperture, a gap being provided between said outer box and said camera mechanism;

a back plate attached to said outer box so that said back plate can selectively open and close said rear aperture; and a cover that covers said gap, said cover having a radially inner portion that defines an aperture through which said camera mechanism can be accessed when said back plate is open, said cover having a radially outer portion that is attached to an inner surface of said outer box and arranged around the radially inner portion and facing said back plate, said radially inner portion protruding toward said back plate farther than a most protruding portion toward said back plate of said radially outer portion, thereby a rear surface of said cover defining water trapping structure that traps water on said rear surface of said cover.

15. The camera of claim 14, wherein said water trapping structure traps water between said rear surface of said cover and said inner surface of said outer box.

16. The camera of claim 14, wherein said cover is a single piece with a rear portion of said camera mechanism.

17. The camera of claim 14, wherein said cover is separate from said camera mechanism.

18. The camera of claim 14, wherein said radially inner portion extends continuously around the aperture through which said camera can be accessed.

19. A waterproof camera comprising:

a camera mechanism that performs photographic processes;

an outer box having a rear aperture, said outer box covering said camera mechanism so that said camera mechanism can be accessed through said rear aperture, a gap being provided between said outer box and said camera mechanism;

a back plate attached to said outer box so that said back plate can selectively open and close said rear aperture; and a cover that covers said gap, said cover having a radially inner portion that defines an aperture through which said camera mechanism can be accessed when said back plate is open, said cover having a radially outer portion that is attached to an inner surface of said outer box and arranged around the radially inner portion and facing said back plate, a rear surface of said cover being opposed to said back plate, wherein a protruding portion of said radially inner portion of said cover that is spaced from said radially outer portion of said cover protrudes toward said back plate farther than a most protruding portion toward said back plate of the radially outer portion.

20. The camera of claim 19, wherein said cover is a single piece with a rear portion of said camera mechanism.

21. The camera of claim 19, wherein said cover is separate from said camera mechanism.

22. The camera of claim 19, wherein said radially inner portion extends continuously around the aperture through which said camera can be accessed.

* * * * *